No. 607,283. Patented July 12, 1898.
H. L. SCHAFFNER.
BICYCLE SADDLE.
(Application filed Oct. 29, 1896.)
(No Model.)
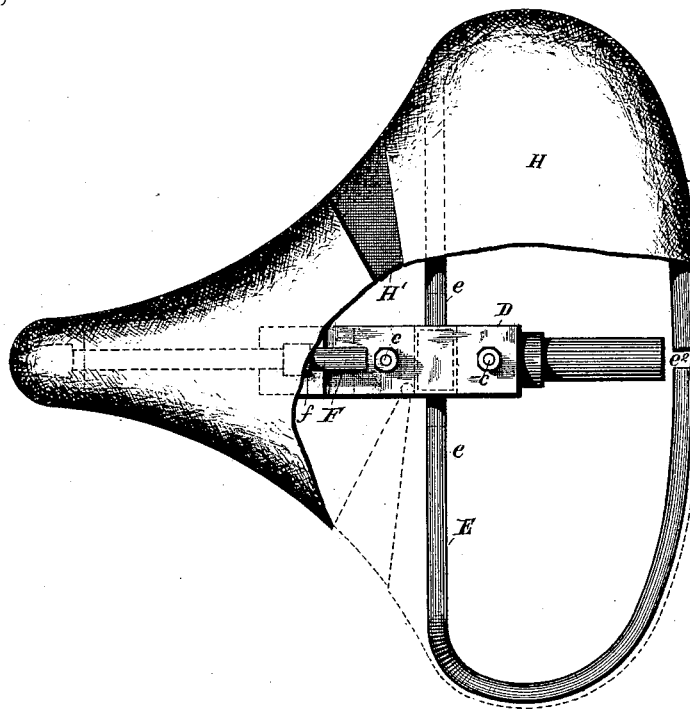
Fig. 1.
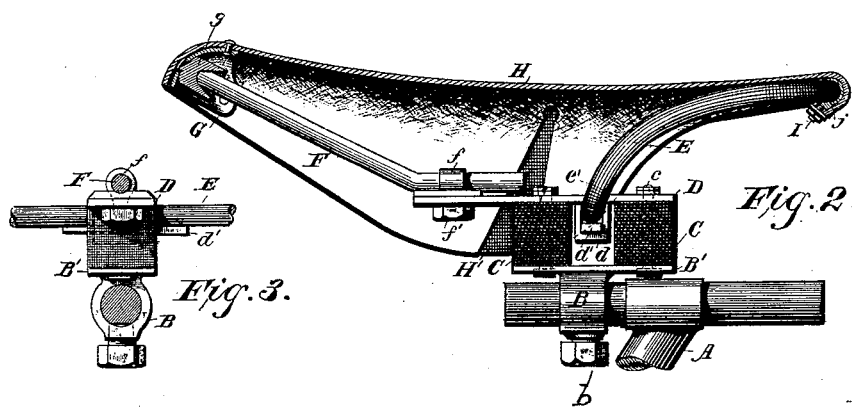
Fig. 2.
Fig. 3.
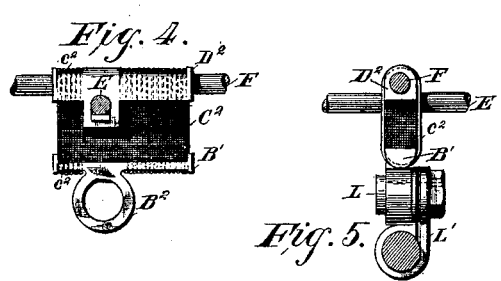
Fig. 4.
Fig. 5.
Fig. 6.
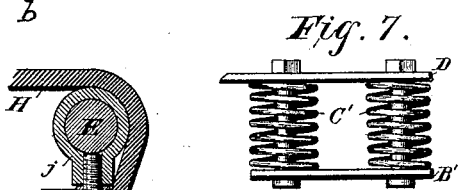
Fig. 7.
Witnesses
Louis G. Julihn
James R. Mansfield
Inventor
Henry L. Schaffner
by Alexander & Dowell
Attorneys
THE NORRIS PETERS CO., PHOTO-LITHO., WASHINGTON, D. C.

UNITED STATES PATENT OFFICE.

HENRY LOUIS SCHAFFNER, OF FLORENCE, ITALY.

BICYCLE-SADDLE.

SPECIFICATION forming part of Letters Patent No. 607,283, dated July 12, 1898.

Application filed October 29, 1896. Serial No. 610,490. (No model.) Patented in England July 29, 1896, No. 16,833.

*To all whom it may concern:*

Be it known that I, HENRY LOUIS SCHAFFNER, of Florence, Tuscany, Italy, have invented certain new and useful Improvements in Bicycle-Saddles, (for which I have obtained Letters Patent in England, No. 16,833, of July 29, 1896;) and I hereby declare that the following is a full, clear, and exact description thereof, reference being had to the accompanying drawings, which form part of this specification.

This invention is an improved saddle for bicycles and like vehicles; and its object is to provide a comfortable, secure, and non-injurious saddle which will measurably accommodate itself to the muscular movements of the legs of the rider when propelling the machine.

The invention consists in the combinations and constructions of parts set forth in the claims, and it has especial reference to, first, the construction of the main seat-frame; second, the connection between the saddle and the saddle-post; third, the seat-cover, and, fourth, the means for attaching the seat-cover to the frame, as hereinafter described, and illustrated in the drawings, in which—

Figure 1 is a top plan view of the saddle, with part of cover broken away, so as to show the underneath parts. Fig. 2 is a longitudinal section of the saddle embodying my improvements. Fig. 3 is a detail sectional view of the saddle on line 2 2, Fig. 1. Figs. 4 and 5 are detail side and front views of a modification of the connection between the saddle and post. Fig. 6 is a side view of another modification of such connection, and Fig. 7 is a detail enlarged section of one of the cover-fastenings.

A designates the saddle-post of a bicycle, of any suitable construction. To this post is fastened the saddle clip or eye B by means of the bolt $b$, as usual. To this eye is fastened a flat plate B', upon which are mounted springs or cushions of suitable material, india-rubber cushions C being indicated in Figs. 1 and 2 and coiled springs C' in Fig. 7.

Above and supported by cushions C is a plate D, which is held in place by bolts $c$, which transfix plates B' and D and cushions C, as shown. This plate is provided with depending eye or loop $d$ intermediate the cushions, in which the front part $e$ of the rear rod E of the saddle-frame (hereinafter described) is fastened by means of the wedge $d'$, as shown, or in other convenient manner.

The saddle-frame consists of a rod E, which in plan resembles a letter D in contour. This rod has a front straight portion $e$, which extends transversely over the saddle-post and under the seat. At each side of the saddle-post the rod is bent upward and rearward, as at $e'$, and then its extremities $e^2$ are bent inward toward each other until they nearly meet on the median line of the saddle.

The form of the rod E which has just been referred to is novel and useful. It is susceptible of movements that accord with the movements of the rider's body resting thereupon. The torsional action of the straight part $e$ permits the sides of the saddle to be alternately depressed, which action could not occur if the extremities of the rod E were not independent and free. It is also true that the flexibility of the springs C and the resiliency of the rod E permit of a series of movements that are very desirable in a bicycle-saddle and are unobtainable in a structure that embodies only the springs on the rod.

To the front end of plate D the beak-rod F is fastened by means of the eyebolt $f$ and nut $f'$, as shown in Fig. 2. This beak-rod projects forward and upward, and its front end fits into a small socket $g$, secured to a metal cap G, to which the beak end of the saddle-cover H is attached. This cover is preferably made of leather and is of substantially ordinary form, having its beak portion fastened to cap G, and its broad seat portion is fastened to the parts $e^2$ of rod E by means of a series of tap-bolts I, slipped through eyelets $h$ in the rear edge of the cover and engaging threaded recesses in annuli $j$ strung on parts $e^2$ of the seat-frame. The tap-bolts not only fasten the cover to the annuli, but secure the latter to the frame, so that the saddle can be easily tightened by turning the annuli on rod E or by moving the beak-bars forward. This makes a simple, secure, easily-adjustable, and readily-detachable means of securing the cover to frame. The connection between the beak of the saddle-cover and the beak-bars is such that the beak can rock upon the beak-bars and adapt itself to the motions of the rider.

The cover H, moreover, at the junction of the bead and main seat portion is gored or slit, as shown, for the insertion of gores H' of elastic webbing or resilient cloth, such gores allowing the cover to readily assume the most comfortable shape for the rider and to vary its shape according to the muscular movements of the legs as would be most comfortable and natural to the rider. This self-adjustment of the cover to the rider and motion of legs and muscles in riding is facilitated by the pivotal connection between the beak and rod C. If, desired, the cover could be upholstered or padded to render it more comfortable.

The shape of frame E, with the extremities in the median line of saddle, adds to the flexibility of the cover and permits it to better follow the motions of the parts, as each half of the saddle is alternately depressed by the leg movements.

In the modifications shown in Figs. 4 and 5 the plate B' has an eye $B^2$, adapted to be fastened by bolt L to a clip L', embracing the saddle-post, and instead of separate cushions C one large cushion $C^2$ is employed, which is secured between plates B' and plate $D^2$ (which replaces plate D) by lacing $c^2$, as shown, or obviously the blocks C C in Fig. 1 may be made in one piece.

It will be observed that by reason of the peculiar connection between the saddle and saddle-post the saddle is permitted to oscillate laterally and horizontally; but its vertical motion or longitudinal oscillation is limited and opposed by the resiliency of the springs or cushions. This adds greatly to the comfort of the rider.

Having thus described my invention, what I therefore claim as new, and desire to secure by Letters Patent thereon, is—

1. The combination with the seat-rod, the annuli thereon, the seat-cover, and the tap-bolts for securing the cover to the annuli, substantially as described.

2. For a bicycle-saddle, a cover having elastic gores in its sides for the purpose and substantially as described.

3. In a bicycle-saddle, the combination of the seat-frame, with the cover having its beak pivotally attached to the frame, and provided with elastic gores, as G in its sides, substantially as and for the purpose set forth.

4. In a bicycle-saddle, the combination of the D-shaped rod E having its free extremities approximating in the median line of the saddle, a supporting-plate D therefor secured to the straight portion of said rod E, devices for attaching said plate to the saddle-post; and a beak-rod attached to said plate with the cover having its seat portion attached to the extremities of the rod E, and its beak attached to the beak-rod, substantially as and for the purpose described.

5. In a bicycle-saddle, the combination of the plate D attached to the saddle-post, a rod E having front bar $e$, connected to plate D, and side parts $e'$ and rear portions $e^2$ substantially as described, and the beak-rod adjustably attached to plate D; with the cover having its seat portion fastened to parts $e^2$ of the rod; and its beak attached to the forward end of said beak-rod, all substantially as described.

6. The combination of the saddle-post, the plate B' attached thereto, the resilient laterally-yielding cushions on said plate, the plate D resting upon said cushions, the D-shaped rod E, and the beak-rod F adjustably attached to plate D; and the saddle-cover attached to said rods, all substantially as and for the purpose described.

In testimony that I claim the foregoing as my own I affix my signature in presence of two witnesses.

HENRY LOUIS SCHAFFNER.

Witnesses:
SPINTO BERNARDE,
GIUSEPPE DEL PINO.